United States Patent
Amir

(10) Patent No.: US 11,801,699 B2
(45) Date of Patent: Oct. 31, 2023

(54) EMULATING 3D TEXTUAL PATTERNS

(71) Applicant: Hewlett-Packard Development Company, L.P., Spring, TX (US)

(72) Inventor: Gideon Amir, Ness Ziona (IL)

(73) Assignee: Hewlett-Packard Development Company, L.P., Spring, TX (US)

(*) Notice: Subject to any disclaimer, the term of this patent is extended or adjusted under 35 U.S.C. 154(b) by 248 days.

(21) Appl. No.: 17/297,398

(22) PCT Filed: Mar. 19, 2019

(86) PCT No.: PCT/US2019/023040
§ 371 (c)(1),
(2) Date: May 26, 2021

(87) PCT Pub. No.: WO2020/190283
PCT Pub. Date: Sep. 24, 2020

(65) Prior Publication Data
US 2022/0009259 A1    Jan. 13, 2022

(51) Int. Cl.
| | | |
|---|---|---|
| *H04N 1/00* | (2006.01) |
| *B41M 3/06* | (2006.01) |
| *H04N 1/23* | (2006.01) |
| *H04N 1/60* | (2006.01) |
| *H04N 1/393* | (2006.01) |
| *H04N 1/40* | (2006.01) |

(52) U.S. Cl.
CPC .......... *B41M 3/06* (2013.01); *H04N 1/00482* (2013.01); *H04N 1/2323* (2013.01); *H04N 1/2353* (2013.01); *H04N 1/393* (2013.01); *H04N 1/40068* (2013.01); *H04N 1/6097* (2013.01)

(58) Field of Classification Search
None
See application file for complete search history.

(56) References Cited

U.S. PATENT DOCUMENTS 7,554,700 B2  6/2009  Miyazaki et al.
8,174,535 B2  5/2012  Berger et al.
(Continued)

FOREIGN PATENT DOCUMENTS

JP    H09272235    10/1997
JP    H09272238    10/1997
(Continued)

OTHER PUBLICATIONS

Akvis Artsuite. "Texture" (Tutorial). Aug. 21, 2018. Available at: https://akvis.com/en/artsuite-tutorial/effects/texture.php.
(Continued)

*Primary Examiner* — Henok Shiferaw

(57) ABSTRACT

Example implementations relate to emulating 3D texture patterns in a printer system. One example implementation receives an image having a number of image pixels and selects from a plurality of digital substrates which each correspond to a physical substrate. Each digital substrate has luminance change data corresponding to heights of a 3D texture pattern at respective locations of the physical substrate. An image having emulated 3D texture is generated by adjusting the luminance of the image pixels corresponding to respective locations of the physical substrate and according to the corresponding luminance change data.

15 Claims, 10 Drawing Sheets

(56) References Cited

U.S. PATENT DOCUMENTS

| | | | | |
|---|---|---|---|---|
| 2003/0086603 | A1* | 5/2003 | Davidson | G06T 3/40 |
| | | | | 382/154 |
| 2004/0125106 | A1* | 7/2004 | Chen | H04N 13/133 |
| | | | | 345/426 |
| 2007/0227332 | A1 | 10/2007 | Causse et al. | |
| 2014/0078490 | A1* | 3/2014 | Higo | G01B 11/25 |
| | | | | 356/4.01 |

FOREIGN PATENT DOCUMENTS

| | | | |
|---|---|---|---|
| JP | 2009204343 A | * | 9/2009 |
| JP | 2010034866 | | 2/2010 |

OTHER PUBLICATIONS

Rachel, "Tutorial Tuesday: How to Create Digital Embossing", Feb. 2, 2016. Available at: http://www.thedigitalpress.co/how-to-create-digital-embossing/.

* cited by examiner

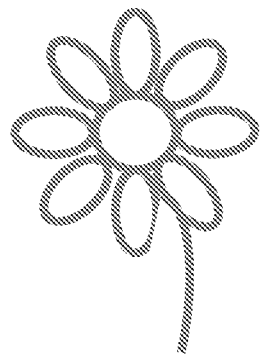 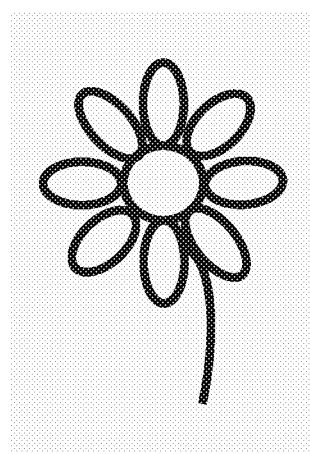 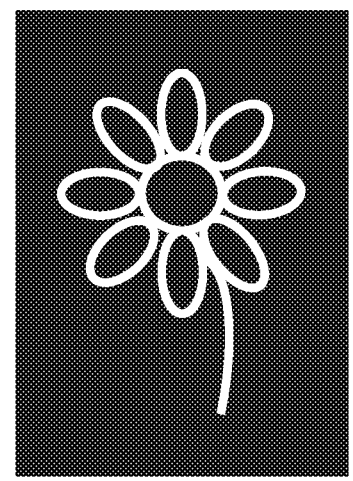
*FIG. 5a*    *FIG. 5b*    *FIG. 5c*
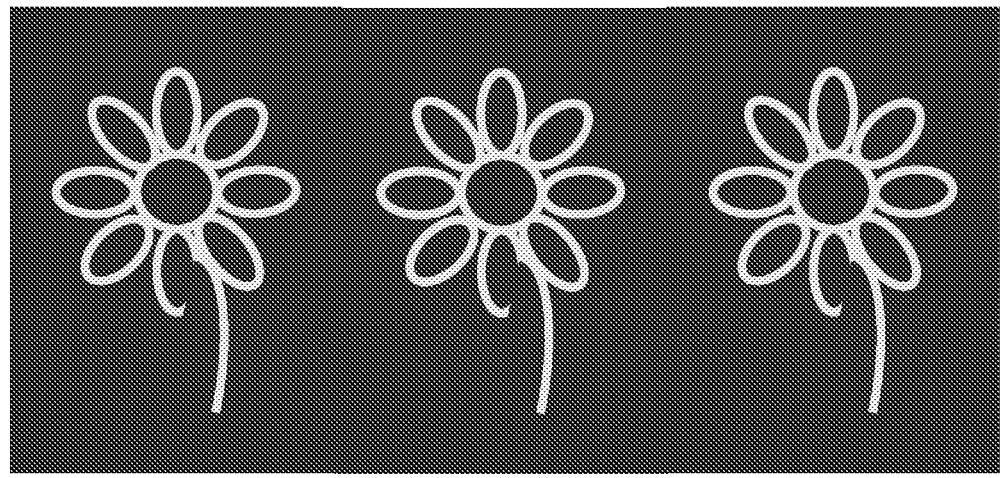
*FIG. 5d*

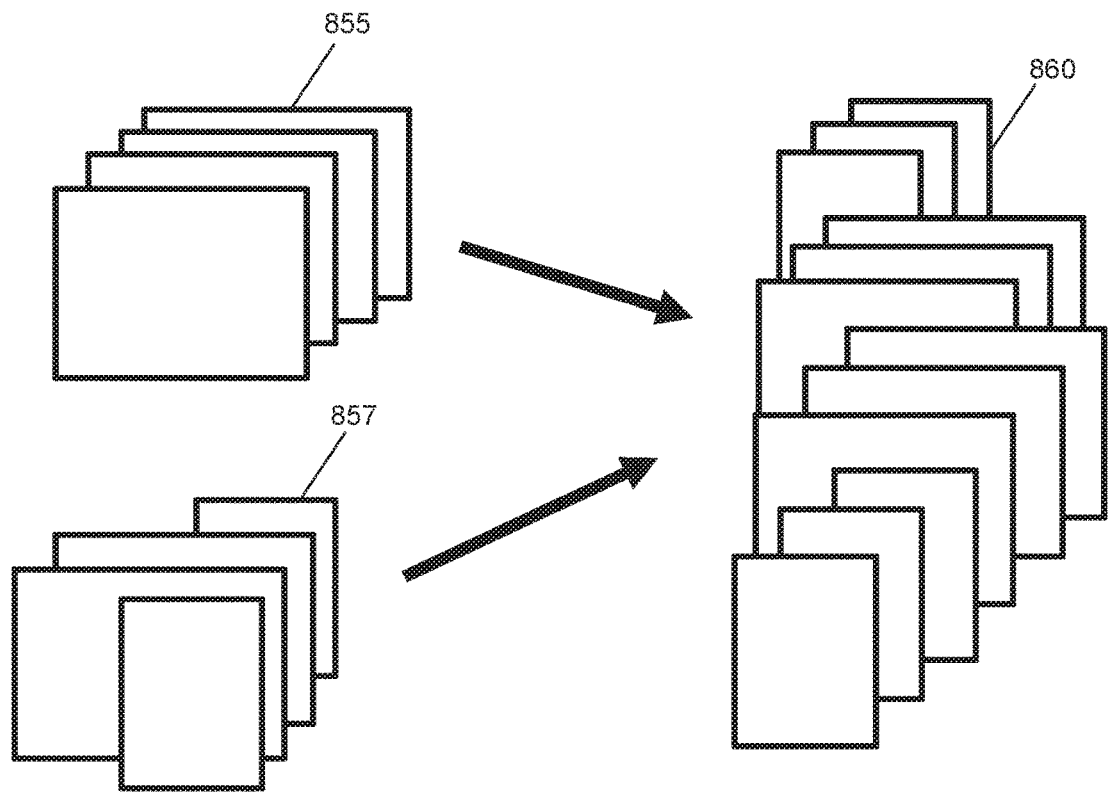
FIG. 8
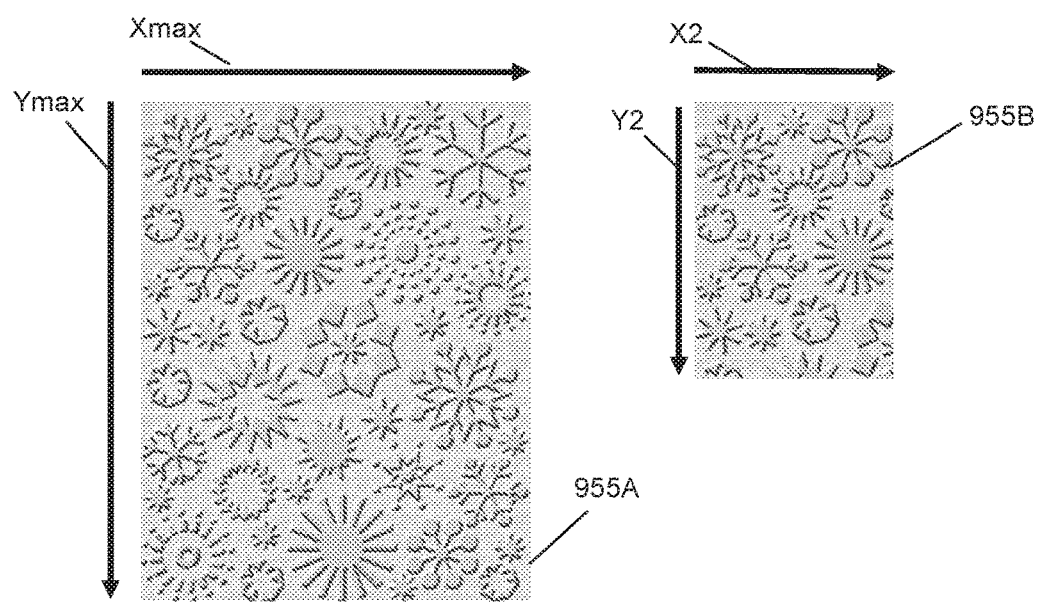
FIG. 9a  FIG. 9b

EMULATING 3D TEXTUAL PATTERNS

BACKGROUND

Embossing in image reproduction is used in many applications and is highly desired by some end users. However, there are challenges in printing embossed substrates, especially when using contact printing methods. In order to address this, it is common to print first on a flat surface, and then use embossing equipment. Embossing of substrates uses heavy machinery with tooling adapted to specific patterns which may be commercially viable for large volumes.

BRIEF DESCRIPTION OF THE DRAWINGS

Various features of the present disclosure will be apparent from the detailed description which follows, taken in conjunction with the accompanying drawings, which together illustrate features of the present disclosure, and wherein:

FIG. 5a-5d illustrate processing of a textual pattern according to an example;

FIG. 8 is a schematic illustration showing processing of an image according to an example;

FIGS. 9a and 9b illustrate two digital substrates according to an example;

DETAILED DESCRIPTION

Certain examples described herein are directed towards emulating 3D texture patterns on printed images. In many applications, the visual effects of 3D textual patterns such as embossing are sufficient, and the tactility normally associated with embossing is not needed. This allows for printing images onto standard non-embossed substrates which improves printing fluid adhesion and reduces cost. This allows for the commercial viability of smaller volumes of images with 3D texture patterns, and increases the options available to a user in terms of the 3D texture patterns that may be combined with different images. The described examples may be particularly useful in digital printing presses, such as large-scale liquid electrophotographic (LEP) print systems.

Figure 1:
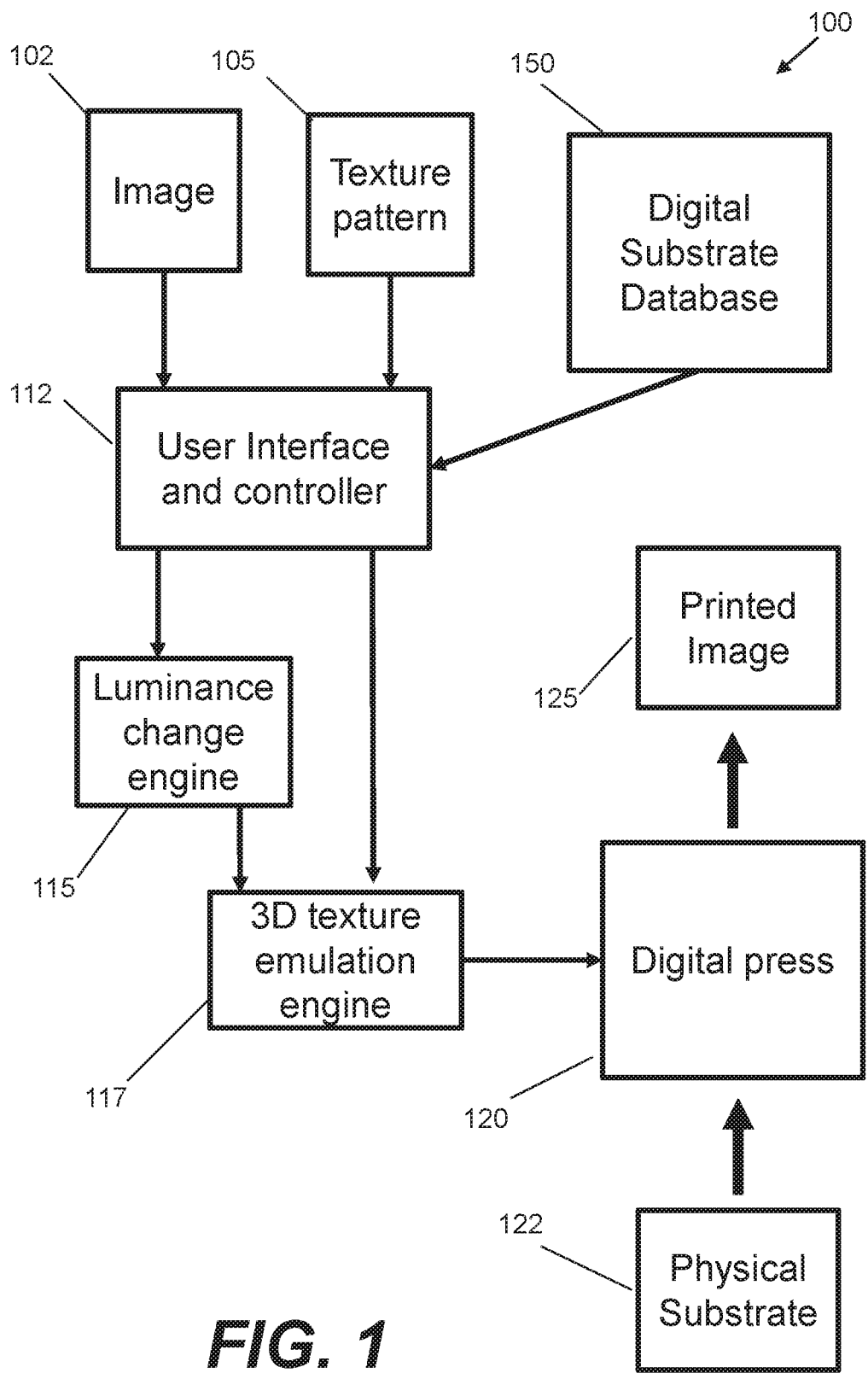
FIG. 1 is a schematic illustration of an image processing system according to an example.

FIG. 1 shows an example of an image processing system 100. The image processing system 100 may be implemented in the form of a computing device running a digital frontend application and/or electronic circuitry forming part of a digital printing press, such as an LEP printing device.

The image processing device 100 may be configured to receive an image 102 and a texture pattern 105. The image 102 may be color image data having a number of image pixels in a Red-Green-Blue (RGB) format, mapped to a particular predefined color space as part of a preprocessing operation. The texture pattern 105 may also be in the form of color image data having a number of pattern pixels in the form of color image data in a Red-Green-Blue (RGB) format. The 3D texture pattern may alternatively be in the form of a height map which may be generated for example from 3D scanning of an embossed substrate.

The image processing device 100 comprises a user interface and controller 112, a luminance change engine 115, and a 3D texture emulation engine 117. The user interface and controller 112 is arranged to receive and/or select one or more images and texture patterns for processing. The images and texture patterns may be in the form of image data having a number of image pixels and texture pattern data having a number of pattern pixels. The user interface and controller 112 may be configured to allow manipulation of the image 102 and texture pattern 105 according to user selections in order to generate image data and texture pattern data respectively. The user interface and controller may be used to scale either or both of the images, for example so that they represent the same physical size. One or both of the image and texture pattern data may be tiled with respect to the other, have their colors and/or luminance changed by a user or an automatic process. One or both of the image and texture pattern data may be low passed filtered corresponding to blurring of an image. Other image processing effects may also be implemented by the user interface and controller 112.

The luminance change engine 115 is arranged to receive 3D texture pattern data from the user interface and controller 112, and to generate luminance change data for each pattern pixel of the 3D texture pattern data. The luminance change data depends on the height of the respective pattern pixels. The pattern pixels are associated with respective surfaces of the 3D textural pattern, depending on the heights of the pixels relative to the lowest plane of the pattern. The luminance change data for each pattern pixel may be determined using an angle between a normal vector of the respective surface and a simulated light vector as will be described in more detail below. The luminance change data may be in the form of a luminance map.

The 3D texture emulation engine 117 is arranged to receive image data from the user interface and controller 112 and luminance change data from the luminance change engine 115. The 3D texture emulation engine 117 is arranged to adjust the luminance of image pixels in the image data depending on the luminance change data of corresponding pattern pixel in order to generate an emulated 3D image comprising the received image with an emulated 3D texture pattern.

The emulated 3D image may be provided to a digital press 120 to print the image onto a physical substrate 122, such as paper of a selected type, in order to generate a printed image 125. The printed image 125 is based on the image data 102 originally received and modified with the 3D texture pattern 105 according to an example processing method described in more detail below. This provides an image with the appearance of an embossed or debossed pattern which emulates a physically embossed substrate.

Figure 2:
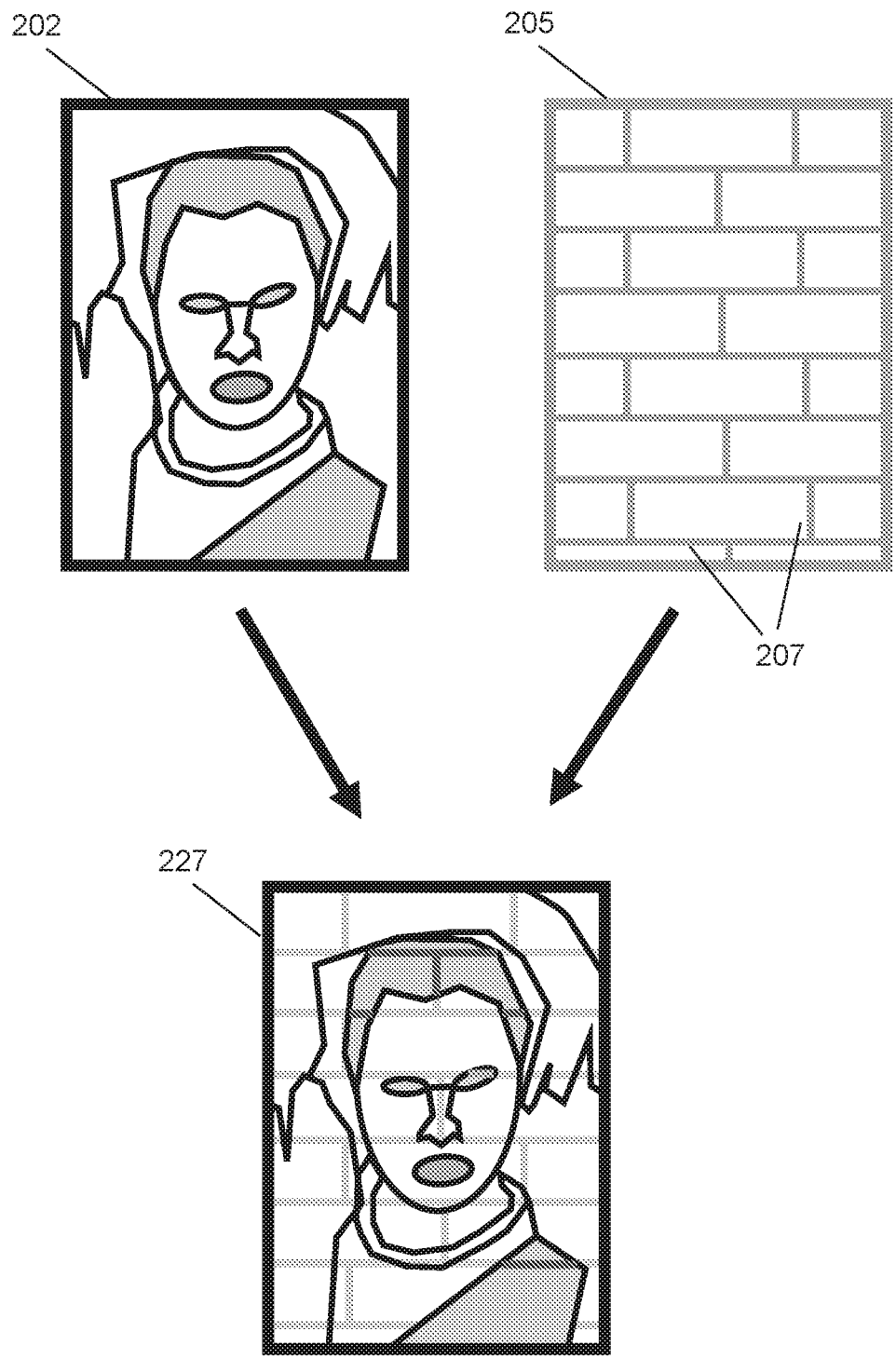
FIG. 2 is a schematic illustration showing data that is used and generated by an imaging processing system according to an example.

FIG. 2 shows examples of an image, texture pattern and emulated 3D image data used and generated by the systems and methods described herein. An image 202 may be in the form of RGB image data and provided to the user interface and controller 112 of the system illustrated in FIG. 1. Other image formats may alternatively be used for example K, CMYK, HSL.

A 3D texture pattern 205 may by provided to the user interface and controller 112 in the form of RGB image data, a height map, or any other suitable format such as K, CMYK, HSL. The 3D texture pattern shown is a simple brick wall pattern in which a number of grooves 207 are recessed in height compared with rest of the pattern. This corresponds to a debossing pattern, however embossing patterns comprising many different heights may also be used. Similarly, complex patterns which may or may not repeat may be used, for example as shown in FIG. 9a.

The emulated 3D texture pattern image 227 includes the brick wall pattern in the image, with the luminance of pixels corresponding to the grooves 207 in the brick wall being adjusted to provide the visual effect of debossing in this example. In other words, parts of the image 227 appear to be at a different height than other parts. In this example, the luminance of pixels in the grooves is lower than pixels corresponding to the same image feature which are not in the grooves. In this example, the lower luminance values of the pixels give the illusion that these pixels are debossed compared with surrounding pixels.

An example method 600 of generating an image with emulated 3D texture pattern is described with respect to FIGS. 3, 4, 5 and 6. The method 600 may be implemented using the system of FIG. 1, but may also be implemented using different equipment. The method 600 may be performed by a computing device comprising a processor, such as a digital frontend for a digital printing press, wherein the method blocks are implemented by executing instructions retried from a coupled memory.

At block 610, an embossing or 3D textural pattern is determined. This may be implemented by receiving a corresponding data file representing a 2D image including pattern pixels, a 3D image including pixel heights, or a height map. In other examples, a 3D scanner may be employed to generate a height map of a 3D texture pattern available to a user of the method. An example 3D texture pattern of a flower outline is shown in FIG. 5a. This pattern is in the form of an RGB image in which the height of the pixels corresponds to their luminance.

At block 620, the image is converted to a luminance map as illustrated in FIG. 5b. This may be implemented by converting the image from RGB format to HSL format and taking the L values of each pixel. The L values will be between 0 (black) and 1 (white). The luminance map can be easier visualized by expanding the range of values and normalizing. In this example, luminance values of an enhanced luminance map are transformed to a standard image format range of 0 (black) to 255 (white). The minimum min L and maximum max L luminance values in the luminance map are determined, for example min L=0 and max L=195.5. The values of the luminance map are then stretched to extend across the entire range, for example by multiplying each luminance value by 255/195.5. The enhanced luminance map now has pixel luminance values ranging across the full luminance range (0-255).

At block 630, the texture pattern is manipulated by a user of the method. This may include inverting the luminance of the image as shown in FIG. 5C. Pixels having lower heights have lower luminance, and so in order to generate an emulated image having an embossed flower outline pattern, the higher pixels are lighter or have higher luminance than the lower pixels which are darker. If the luminance were not inverted, this would result in a debossing pattern which may be appropriate in some applications. The user may also use tiling as shown in FIG. 5d in which multiple images are repeated next to each other. Many different types of tiling are available, for example mirror tiling, and may be used by the user. The texture image may also be scaled, blurred or low pass filtered, and many other manipulations may be performed. These or different manipulations may also be performed on the original image prior to conversion to a luminance map. In still other examples, a luminance map may be provided directly from an external source.

Figure 3:
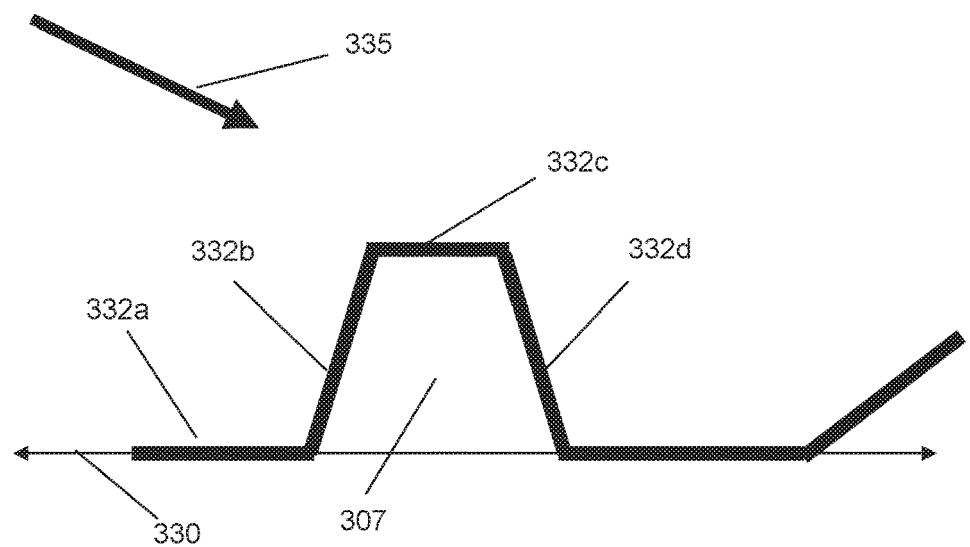
FIG. 3 is a schematic illustration showing processing of a detail of a textual pattern according to an example.

At block 640, luminance change data in the form of a delta luminance map is generated using the enhanced luminance map. The luminance change data for each pixel depends on an angle between a normal of a respective surface and a simulated light vector as described with respect to FIGS. 3 and 4. FIG. 3 shows a section through a 3D textual pattern having different parts at different heights with respect to an origin plane 330 corresponding to a non-embossed substrate. The pattern includes lines corresponding to facets 332a at the same height as the origin plane 330, as well as facets 332b at an elevated height compared with the origin plane. This may correspond with an embossed part of a substrate, for example the flower outline pattern of FIG. 5a-d. The embossed part 307 corresponds to a raised feature of a 3D texture pattern and includes sloping facets 332b and 332d of changing height between the lower 332a and upper 332c facets. The change in height may be achieved abruptly with a facet at 90 degrees to the origin plane, or more gradually as shown.

A simulated light vector 335 corresponds to incoming light that impinges on the facets 332a-d. The simulated light vector 335 may correspond with planar light which is distributed across the entire surface of the pattern but traveling in the same direction. In an example the angle of the simulated light vector 335 and the origin plane 330 will be acute with the height (z-axis) of the light source being half of the maximum height of the embossing patterns. This provides good contrast between facets at different angles in order to emulate the 3D texture pattern. The simulated light vector can point in any x,y direction. Different z-axis heights may alternatively be used for the simulated light. It will be appreciated that facet 332b which faces the simulated light will have enhanced luminance compared with facet 332d which faces away from the simulated light, thus changing the relative luminance of these two facets. The change in luminance at each position on the facets corresponds to luminance change data which will be used to adjust the luminance of image pixels corresponding to these locations.

Figure 4:
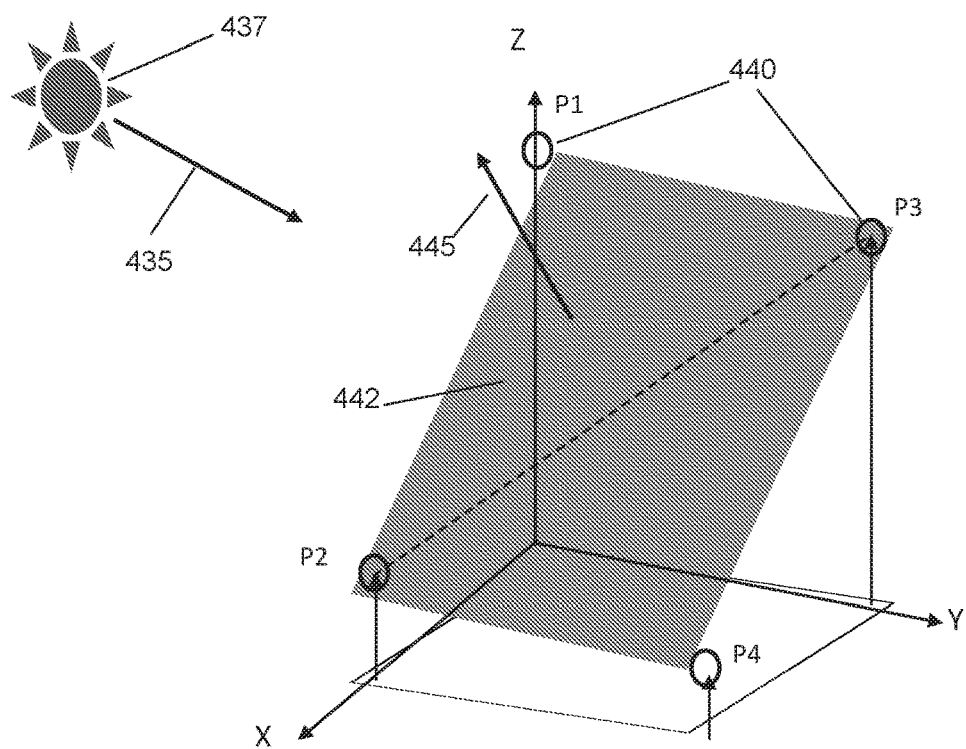
FIG. 4 is a schematic illustration showing processing of a pixel of a textual pattern according to an example.

FIG. 4 illustrates four pattern pixels (P1-P4) 440 that may correspond with one of the facets shown in FIG. 3. An xyz coordinate system is shown, with the xy plane corresponding to the origin plane 330 of FIG. 3. The z-axis corresponds to the height of the pattern pixels from the origin plane. The height may be determined from the enhanced luminance map, or directly from the height map. A maximum height can be assigned Max Z, and the height of each pixel determined using its respective luminance value according to the equation Z(pixel)=L*Max Z/255, where 255 is the maximum luminance, and L is the luminance of the pixel.

Each pixel (P1) 440 is associated with a respective surface 442. The surface for each pixel (P1) may be generated using the pixel (P1) and two (P2, P3) or more (P4) adjacent pixels, and approximates the facet to which the pixel belongs. In the example shown, the surface for pixel P1 is determined using itself and the adjacent pixels extending one further distance unit (one pixel) on the x and y axes. The surface for pixel P3 will be determined using pixel P4 (adjacent pixel o the x-axis) and another pixel (not shown) which extends one further pixel distance on the y-axis. The normal vector 445 of each surface is then determined.

The simulated light vector 435 in this example corresponds to a point source 437 which may be at a height higher than all pattern pixels and located at a corner of the texture pattern. Alternatively, planar light at a height (z-axis) half the height of the highest 3D texture pattern feature may be used. In an example, the simulated light source may be located at half the maximum height (z=Max Z), half the image width (y=image_width/2) and at the top of the image (x=0).

The angle between the normal vector 445 associated with each pattern pixel 440 and the simulated light vector 435 is determined and used to assign luminance change data for that pixel. A small angle corresponds to a pattern pixel on a facet directly facing the simulated light (eg 332b) and is therefore associated with an area of increased luminance. An area of the pattern that corresponds to an incident angle of around 90 degrees (eg 332a, 332c) may be associated with a relatively small increase in luminance. An area that corresponds to a large angle of around 180 degrees (eg 332d) may correspond to an area of no increased luminance. The luminance change data may be normalized so that pixels 440 associated with surfaces 442 having a large angle between their normal 445 and the simulated light vector 435 may be associated with a negative luminance change value. Alternatively, a parameter of between 1 and 0 may be determined which defines the maximum added or subtracted illuminance. The luminance change data are determined for each pattern pixel to generate a delta luminance map. The delta luminance may be further manipulated by a user, for example to change the value of the delta luminance values to accentuate or reduce the 3D effect.

At block 650, an image is received which may be in the form of a number of RGB image data comprising a number of image pixels for example. The image data may be manipulated by a user to adjust its scale, color or other parameters. The manipulated image data is aligned with the manipulated texture pattern which may provide a one to one correspondence between the image pixels and the pattern pixels, but this is not necessary, and each pattern pixel may correspond to two or more image pixels.

At block 660, the luminance of each image pixel is adjusted according to the luminance change data of a corresponding pattern pixel. The RGB format image pixels may be converted to HSL format and the L value of each image pixel adjusted by the corresponding delta luminance value. The new luminance value newL may be limited so that it does not exceed 1 nor is below 0. The HSL format image (with L now=newL) is then converted back to RGB format to provide an image with an emulated 3D texture pattern.

The method may be used to generate images with a number of different emulated 3D texture effects to provide the illusion of physical embossing. In one example, a background texture pattern for an image may be determined for example using a 3D scanner or data provided by a provider of the background. Example background may include a brick wall panel, a corkboard, embossed wallpaper. A section of the background corresponding to a size of an image to be placed on the background is used as the texture pattern 105 and a delta luminance map or luminance change data is determined as described above. An image is then obtained and scaled to the size of the background section, and an image with an emulated 3D texture pattern corresponding to the background section is generated. This image is then printed and may be located on the background section so that the texture pattern of the background appears to seamlessly flow through the image. In addition to printing onto flat substrates, the method may also be applied to a 3D printer that prints objects using build material and to which an image having emulated 3D texture may be applied.

Figure 6:
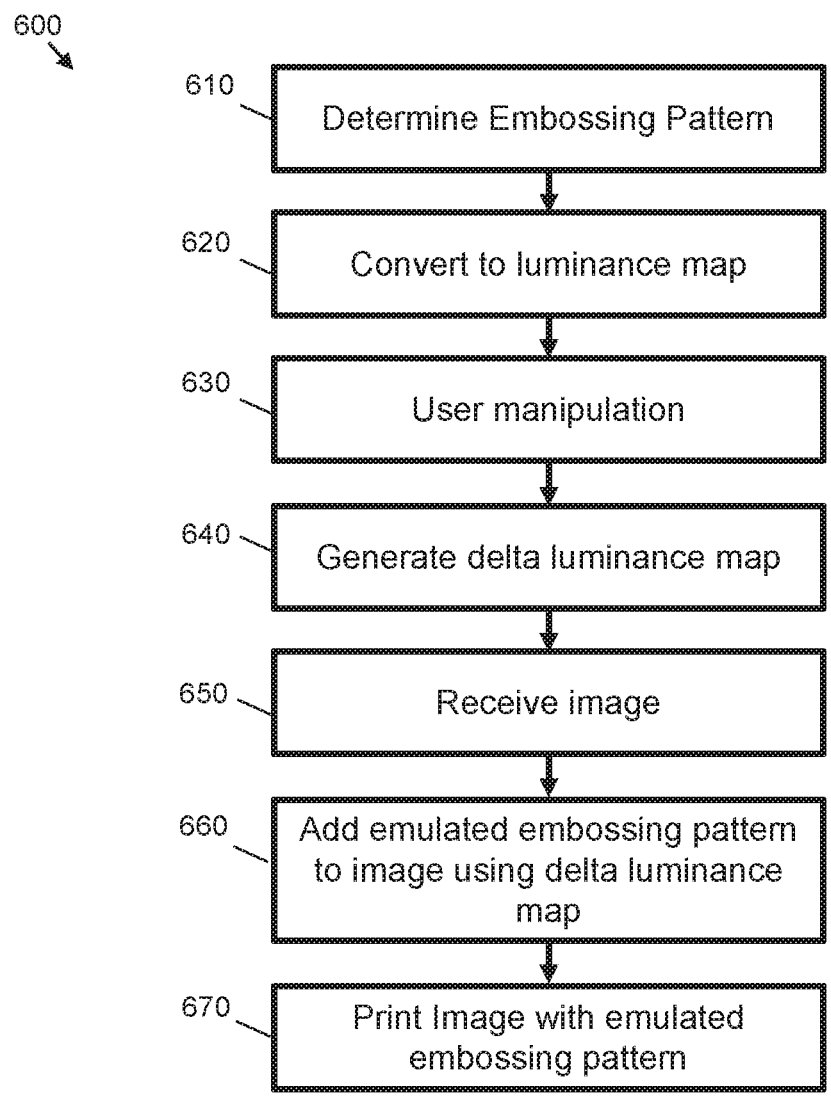
FIG. 6 is a flow chart showing a method of processing an image according to an example.
Figure 7:
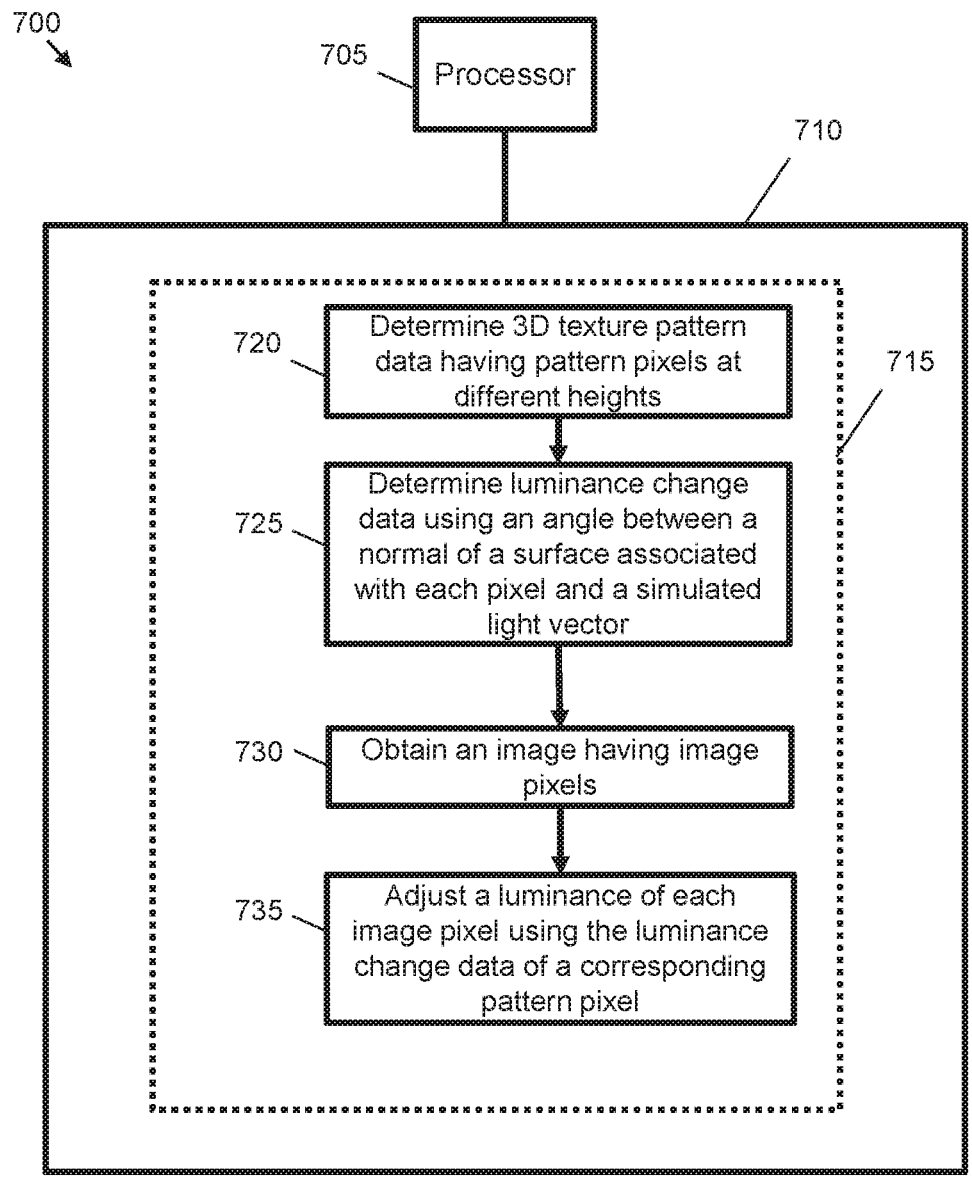
FIG. 7 is a schematic illustration of a non-transitory computer-readable storage medium according to an example.

FIG. 7 shows an example 700 of a processor 705 communicatively coupled to a non-transitory computer readable storage medium 710 that stores instructions 715 for execution by the processor 705. Via instruction 720, the processor is instructed to determine a 3D texture pattern data having pattern pixels at different heights. Via instruction 725, the processor is instructed to determine luminance change data using an angle between a normal of a surface associated with each pixel and a simulated light vector. Via instruction 730, the processor is instructed to obtain an image having image pixels. Via instruction 735, the processor is instructed to adjust a luminance of each image pixel using the luminance change data of a corresponding pixel pattern. The instructions 715 may represent an implementation of the method 600 from FIG. 6.

In another example of image processing system 100, a digital substrate database 150 is employed. This may be used as an alternative or in addition to receiving and processing the 3D texture pattern 105. The digital substrate database may be installed physically with the image processing system 100 and/or the digital press 122, or it may be stored remotely on cloud servers for example.

The digital substrate database 150 is coupled to the user interface and controller 122 which allows a user to select one of a plurality of digital substrates for use with a received image 102. The selected digital substrate already comprises predetermined delta luminance data which can be used by the 3D texture emulation engine to generate an image with emulated 3D texture for printing on a physical substrate 122 associated with the digital substrate.

The use of digital substrates in an example is illustrated in FIGS. 8, 9a and 9b. Digital substrates 860 are an association of 3D texture patterns 855 and physical substrates 857. Digital substrates provide a user-friendly way to allow a user of a digital press or other printing system to select emulated embossing patterns to be used with images. An example 3D texture or embossing pattern is shown in FIG. 9a. The pattern 955A has a width X max and length Y max which corresponds with the maximum size of physical substrate that can be used by a digital press. 3D texture pattern may be determined from a 3D scan of a physically embossed substrate or using an image (eg photograph) of the embossed substrate which is processed according to the method described with respect to FIGS. 3 and 4 in order to generate a delta luminance map.

The digital substrate comprises a delta luminance map having luminance change data corresponding to heights of the 3D texture pattern at respective locations of a physical substrate. In other words, the pattern is tied to a physical substrate to be used so that the pattern can be predictably and reliably applied to physical substrates by a digital press or other printing system. This allows an operator of a digital press to select from among a number of combinations of 3D texture patterns and physical substrates onto which to print an image.

FIG. 9b illustrates a digital substrate 955B using the same 3D texture pattern as that used in FIG. 9a, but which is associated with a smaller physical substrate. The smaller physical substrate has width X2 and length Y2, and may be an A4 size compared to an A3 size of the physical substrate of FIG. 9a. The pattern is cropped in FIG. 9b compared with FIG. 9a, and not scaled. This means that the size of the pattern features are maintained, and the two physical substrates may be used together, for example to complete the wallpapering of a wall where a smaller physical substrate is used to complete a small end strip or detail. This also provides consistency amongst multiple copies of an image onto the same size physical substrate.

Figure 11:
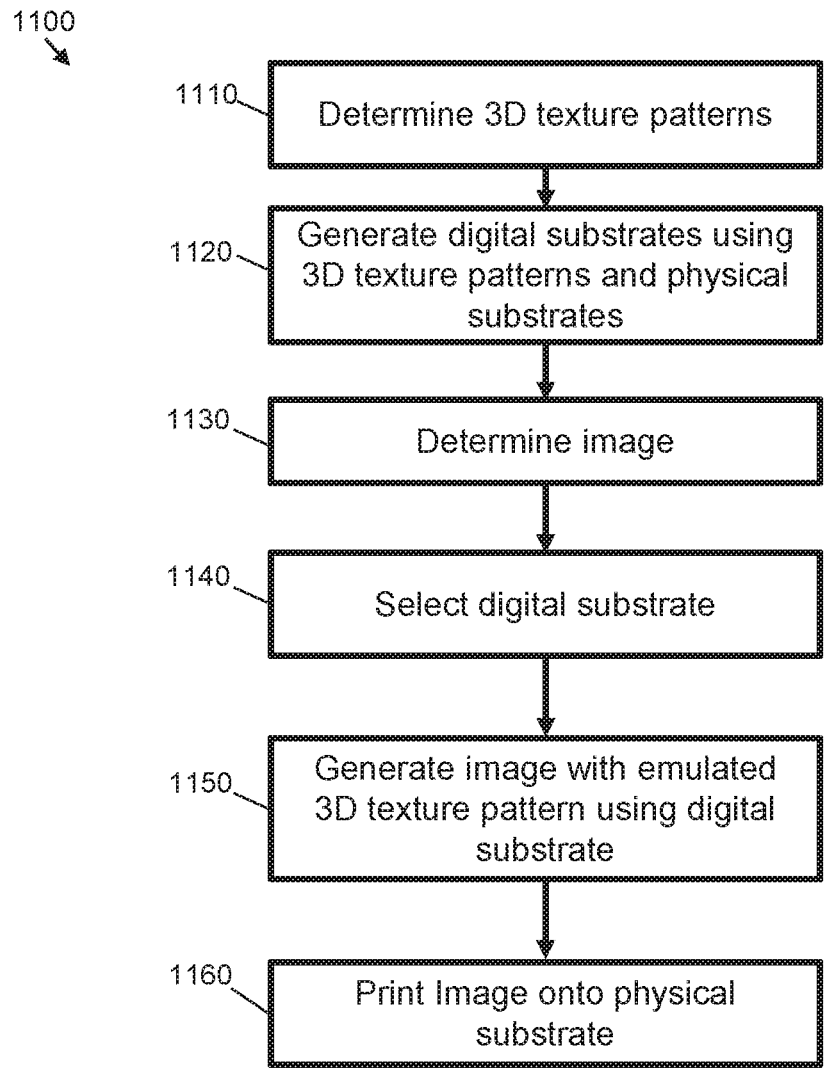
FIG. 11 is a flow chart showing a method of processing an image according to an example.

An example method 1100 of generating an image with emulated 3D texture pattern is described with respect to FIG. 11. The method 110 may be implemented using the system of FIG. 1 but may also be implemented using different equipment. The method 1100 may be performed by a computing device comprising a processor, such as a digital frontend for a digital printing press, wherein the method blocks are implemented by executing instructions retried from a coupled memory.

At block 1100, a number of 3D texture patterns are determined, for example using 3D scanning, photography, or receiving height map files or luminance map files. Each of these sources may be used to represent a 3D texture pattern having pixels at different heights with respect to an origin plane.

At block 1120, a number of digital substrates are generated using a combination of a 3D texture pattern and a physical substrate. The digital substrates comprise a delta luminance map or luminance change data associated with respective pattern pixels, where the pattern pixels are associated with a coordinate or location on the physical substrate. Referring to FIGS. 9a and 9b for example, the same 3D texture pattern is used with two different sized physical substrates. Each position in these substrates is associated with a predetermined pattern pixel which has associated luminance change data. Therefore, each time an image is printed onto a physical substrate, the same emulated 3D pattern with features in the same locations on the substrate is used.

In order to generate each digital substrate, the 3D texture pattern may be converted into a height map and a simulated light source used to determine delta luminance values as described previously with respect to FIG. 4. However other methods may be used, for example using delta luminance values that are dependent on the luminance or height values of corresponding pixels in luminance and height maps. Delta luminance maps may also be provided directly in the form of digital files from an external provider.

The determined delta luminance maps are then scaled to a predetermined size so that pixels of each delta luminance map correspond to locations on a physical substrate. The predetermined size may be the size of the largest physical substrate useable by a printing apparatus to be used with the digital substrates. A smaller physical substrate associated with the same pattern uses a portion of the full pattern, as illustrated when comparing FIGS. 9a and 9b.

Each digital substrate therefore comprises a delta luminance map (or some other luminance change data) having a number of pattern pixels and which is associated with a physical substrate so that the pattern pixels and thus pattern features have an associated location on the physical substrate. Therefore, each time an image is printed onto a physical substrate associated with the digital substrate, the same pattern in the same location is used. The digital substrate represented in FIG. 9a may be a delta luminance map 955A sized to match a particular physical substrate, for example A3. The digital substrate in FIG. 9b is a cropped version of the same delta luminance map sized to match a different sized physical substrate, for example A4.

Various parameters of the delta luminance map may be adjusted to generate a desired digital substrate. For example, the delta luminance values may be increased or decreased to provide the impression of more or less height in the emulated pattern. Other manipulations such as tiling, inverting the luminance and blurring may be employed as previously described. Once the delta luminance map is generated and associated with a physical substrate, the delta luminance values may be further modified depending on other physical characteristics of the physical substrate. For example, if the physical substrate is glossy, the delta luminance values may all be reduced by a common factor. Similarly, if the physical substrate is made of a very matt material, the delta luminance values may be increased by a factor. The physical characteristics of the physical substrate may also affect of aspects of a printed image such as color, and so the physical substrate may be associated with a correcting factor to adjust the color or other parameters of an image to be printed. Examples of physical characteristics of the physical substrate that may affect non-luminance parameters such as color include: substrate material; glossiness; thickness; substrate color; grains direction.

The digital substrates may be generated by a user and stored in a digital substrate database 150 for later use with an image. Alternatively, or additionally, the digital substrates may be provided by an external provider, for example via a cloud server or as a file provided with an image to be printed.

At block 1130, an image having a number of image pixels is determined. This may be provided as an RGB format data file to the user and interface controller 112. At block 1140, a digital substrate is selected. This may be implemented at the user interface and controller 112 where a user selects from a number of digital substrates on a digital substrate database 150. Alternatively, the digital substrate may be selected and downloaded from an external source such as a cloud server. In a further alternative, the digital substrate may be selected according to a digital substrate identifier associated with the determined image. As the digital substrates are linked to the printing apparatus to be used, the identifier may be used to select an appropriate digital substrate for a particular digital press based on information contained within the identifier. A user may also have the option of using a texture pattern 105 not represented by available digital substrates by using the method described above with respect to FIG. 6.

At block 1150, an image with emulated 3D texture pattern is generated using the determined image and the selected digital substrate. This corresponds to block 660 of the method of FIG. 6. Here the luminance of each image pixel is adjusted according to the luminance change data or delta luminance map of the selected digital substrate. The RGB format image pixels may be converted to HSL format and the L value of each image pixel adjusted by the corresponding delta luminance value. The new luminance value newL may be limited so that it does not exceed 1 nor is below 0. The HSL format image (with L now=newL) is then converted back to RGB format to provide an image with an emulated 3D texture pattern. The size of the image may first be scaled to the same size as the digital substrate, and various other image processing effects may be implemented by a user prior to adjusting the luminance of the image pixels.

At block 1160, the image with emulated 3D pattern data is sent to a digital press or other printing apparatus, and is printed onto a digital substrate corresponding to the selected digital substrate. The image may be manipulated in a different way prior to adjusting of luminance however the same emulated 3D texture pattern will be provided when printing again with the same selected digital substrate.

The method provides a user-friendly method of operating a digital press, office or small home printer to print images with emulated 3D texture patterns. The method may also be applied to a 3D printer that prints objects using build material and to which an image having emulated 3D texture may be applied.

Figure 10:
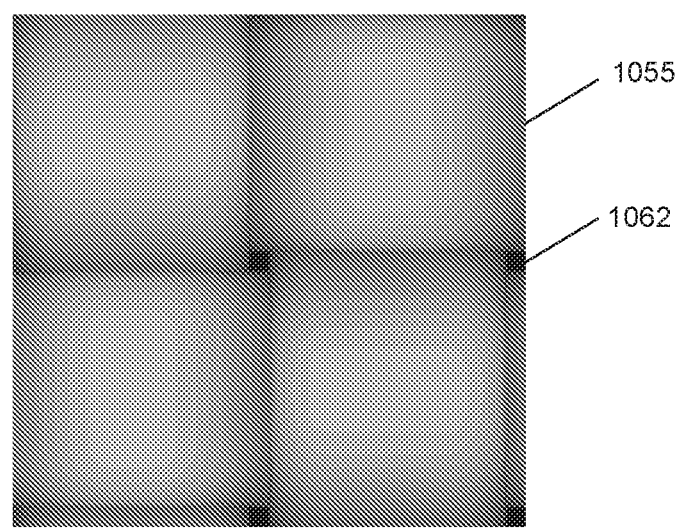
FIG. 10 is a schematic illustration of another digital substrate according to an example.

In another example illustrated in FIG. 10, the luminance change data may be arranged to adjust the luminance of image pixels to a predetermined level depending on certain features of the 3D texture pattern. For example, the 3D texture pattern 1055 of FIG. 10 corresponds to a weave pattern of horizontal and vertical strips of material and having holes 1062 at corners of the overlap. The holes can be represented by low-absorbing very dark or black colors, or by bright and white colors representing a light passing through the holes, despite the luminance adjusting processing that occurs at other parts of the pattern. The allocation of predetermined luminance value (eg 0 for black) ensures that the effect of this pattern is maintained.

Figure 12:
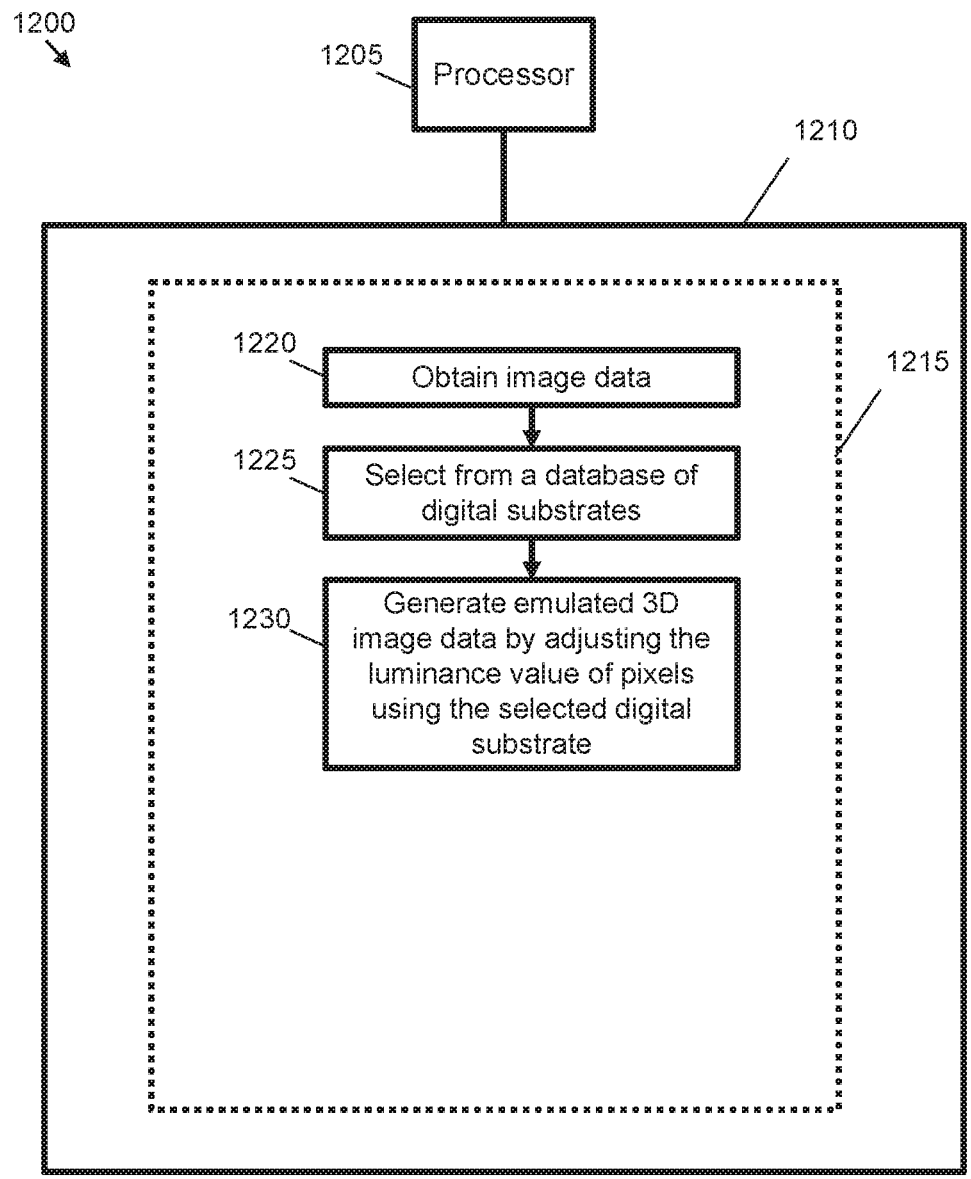
FIG. 12 is a schematic illustration of a non-transitory computer-readable storage medium according to an example.

FIG. 12 shows an example 1200 of a processor 1205 communicatively coupled to a non-transitory computer readable storage medium 1210 that stores instructions 1215 for execution by the processor 1205. Via instruction 1220, the processor is instructed to obtain image data having a number of image pixels. Via instruction 1225, the processor is instructed to select from a database of digital substrates. This may be responsive to a user selection or information received with the image for example. Via instruction 1230, the processor is instructed to generate an image with an emulated 3D texture by adjusting the luminance values of the image pixels using the selected digital substrate. The instructions 1215 may represent an implementation of the method 1100 from FIG. 11.

At least some aspects of the examples described herein with reference to the drawings may be implemented using computer processes operating in processing systems or processors, e.g. as described with reference to FIG. 6. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Similarly, it will be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least the image processing pipelines and components as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A printing system comprising:
a processor arranged to receive an image having a number of image pixels;
a user interface for selecting from a plurality of digital substrates each corresponding to a physical substrate, each digital substrate having luminance change data corresponding to heights of a 3D texture pattern at respective locations of the physical substrate;
the processor further arranged to generate an emulated 3D image by adjusting the luminance of the image pixels corresponding to respective locations of the physical substrate and according to the corresponding luminance change data.

2. The system of claim 1, wherein the 3D texture pattern corresponds to a size of the largest physical substrate useable by the printing system.

3. The system of claim 2, wherein the luminance change data corresponds to a luminance change map having pixels corresponding to respective locations of the largest physical substrate, and wherein the luminance change map is cropped for digital substrates associated with a smaller physical substrate.

4. The system of claim 1, wherein the digital substrate is associated with one or more physical characteristics of the corresponding physical substrate, including: substrate material; glossiness; thickness; substrate color; grains direction.

5. The system of claim 4, wherein the luminance values of the image pixels are all adjusted by an additional predetermined amount or proportion depending on the physical characteristics.

6. The system of claim 4, wherein a non-luminance parameter of the image pixels is adjusted depending on the physical characteristics.

7. The system of claim 1, comprising printing components arranged to print the emulated 3D image onto a physical substrate corresponding to the selected digital substrate.

8. The system of claim 7, comprising a database having a plurality of digital substrates corresponding to physical substrates useable by the printing components.

9. The system of claim 1, wherein the processor is arranged to scale the image to the size of the physical substrate.

10. The system of claim 1, wherein the processor is arranged to convert the image from an RGB format to an HSL format before adjusting the luminance of the image pixels, and to convert back to an RGB format after adjusting the luminance of the image pixels.

11. The system of claim 1, wherein the processor is arranged to adjust the luminance to a predetermined value at locations for the physical substrate of predetermined features of the 3D texture pattern.

12. The system of claim 11, wherein the predetermined value corresponds to a background color of Black or Gray and the predetermined feature is a hole.

13. A method comprising:
- receiving an image having a number of image pixels;
- receiving a user selection from a plurality of digital substrates each corresponding to a physical substrate, each digital substrate having luminance change data corresponding to heights of a 3D texture pattern at respective locations of the physical substrate;
- generating an emulated 3D image by adjusting the luminance of the image pixels corresponding to respective locations of the physical substrate and according to the corresponding luminance change data.

14. The method of claim 13, comprising printing the emulated 3D image onto a physical substrate corresponding to the selected digital substrate.

15. A non-transitory computer readable storage medium storing instructions that, when executed by a processor, cause the processor to:
- receive an image having a number of image pixels;
- receive a user selection from a plurality of digital substrates each corresponding to a physical substrate, each digital substrate having luminance change data corresponding to heights of a 3D texture pattern at respective locations of the physical substrate;
- generate an emulated 3D image by adjusting the luminance of the image pixels corresponding to respective locations of the physical substrate and according to the corresponding luminance change data.

\* \* \* \* \*